United States Patent
DeVos

(10) Patent No.: US 9,128,931 B2
(45) Date of Patent: Sep. 8, 2015

(54) COMMUNICATION OF DIGITAL INFORMATION PRESENTED ON AN APPLIANCE DISPLAY

(71) Applicant: General Electric Company, Schenectady, NY (US)

(72) Inventor: Richard DeVos, Goshen, KY (US)

(73) Assignee: General Electric Company, Schenectady, NY (US)

( * ) Notice: Subject to any disclaimer, the term of this patent is extended or adjusted under 35 U.S.C. 154(b) by 273 days.

(21) Appl. No.: 13/716,561

(22) Filed: Dec. 17, 2012

(65) Prior Publication Data

US 2014/0170969 A1    Jun. 19, 2014

(51) Int. Cl.
*G06F 17/30* (2006.01)
*H04W 4/00* (2009.01)
*H04W 12/06* (2009.01)

(52) U.S. Cl.
CPC ............... *G06F 17/30* (2013.01); *H04W 4/008* (2013.01); *H04W 12/06* (2013.01)

(58) Field of Classification Search
CPC ....... G06F 17/30; G06F 1/1698; G06F 3/021; H04B 5/0031; H04B 10/12; H04B 10/80
USPC .................. 455/414.1, 41.1, 41.2, 41.3, 66.1, 455/67.11, 90.1
See application file for complete search history.

(56) References Cited

U.S. PATENT DOCUMENTS

| | | | |
|---|---|---|---|
| 2005/0046584 A1* | 3/2005 | Breed | 340/825.72 |
| 2005/0073422 A1* | 4/2005 | Graff | 340/641 |
| 2009/0140056 A1* | 6/2009 | Leen | 236/49.3 |
| 2010/0082455 A1 | 4/2010 | Rosenblatt et al. | |
| 2012/0108230 A1* | 5/2012 | Stepanian | 455/422.1 |
| 2013/0015753 A1* | 1/2013 | Son et al. | 312/405 |
| 2013/0069794 A1* | 3/2013 | Terwilliger et al. | 340/815.45 |
| 2013/0198056 A1* | 8/2013 | Aldrey et al. | 705/38 |
| 2013/0215467 A1* | 8/2013 | Fein et al. | 358/1.15 |
| 2014/0074346 A1* | 3/2014 | Chiaverini | 701/31.5 |

FOREIGN PATENT DOCUMENTS

| | | |
|---|---|---|
| JP | 2004110148 | 4/2004 |
| WO | WO 2011/087329 A2 | 7/2011 |

* cited by examiner

*Primary Examiner* — Andrew Wendell
(74) *Attorney, Agent, or Firm* — Dority & Manning, P.A.

(57) ABSTRACT

A system and method of communicating information associated with an appliance is provided. An appliance can present an optical machine-readable representation, such as a linear or matrix barcode, on a display of the appliance. The optical machine-readable representation can encode information associated with an event occurrence for the appliance. A client, such as a computer, smartphone, tablet, etc., can capture information indicative of the optical machine-readable representation. The client computing device can then access information, such as diagnostic information, responsive to the optical machine-readable representation.

13 Claims, 3 Drawing Sheets

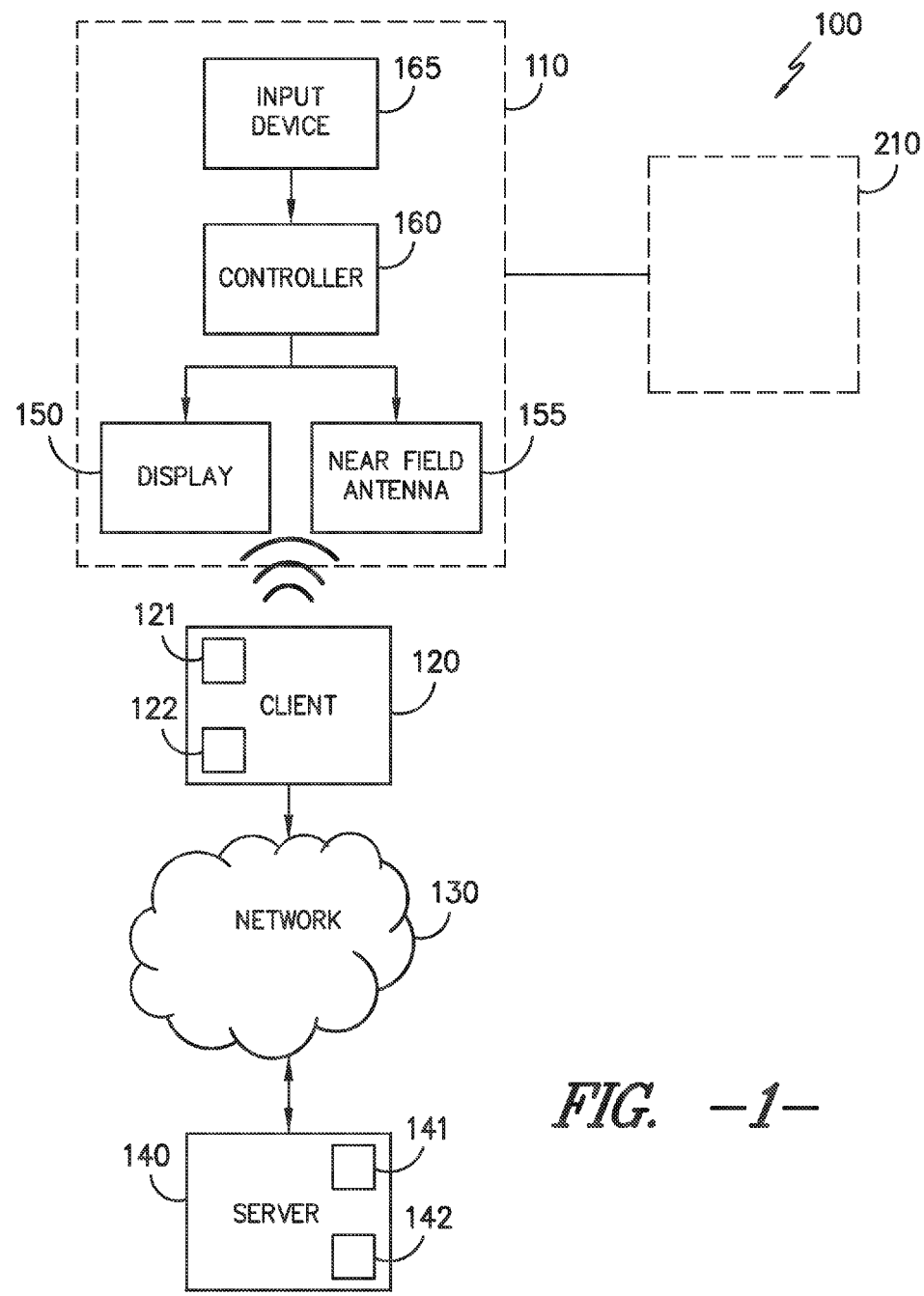
FIG. -1-

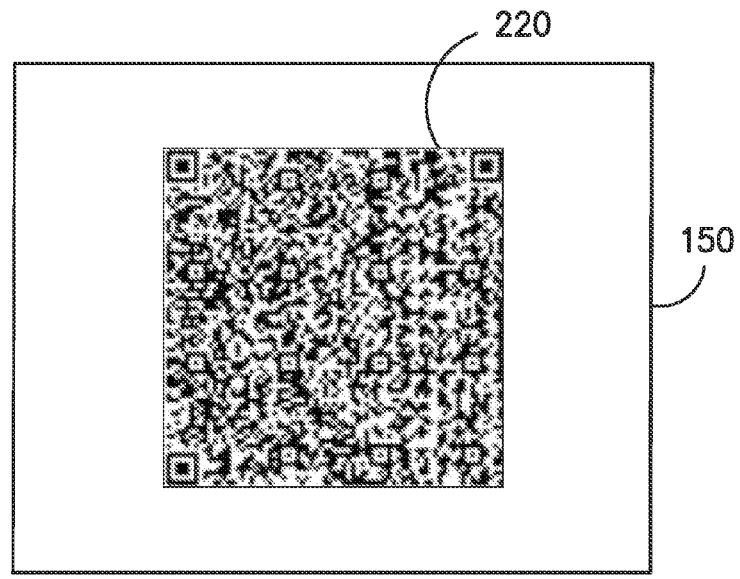
FIG. -2-
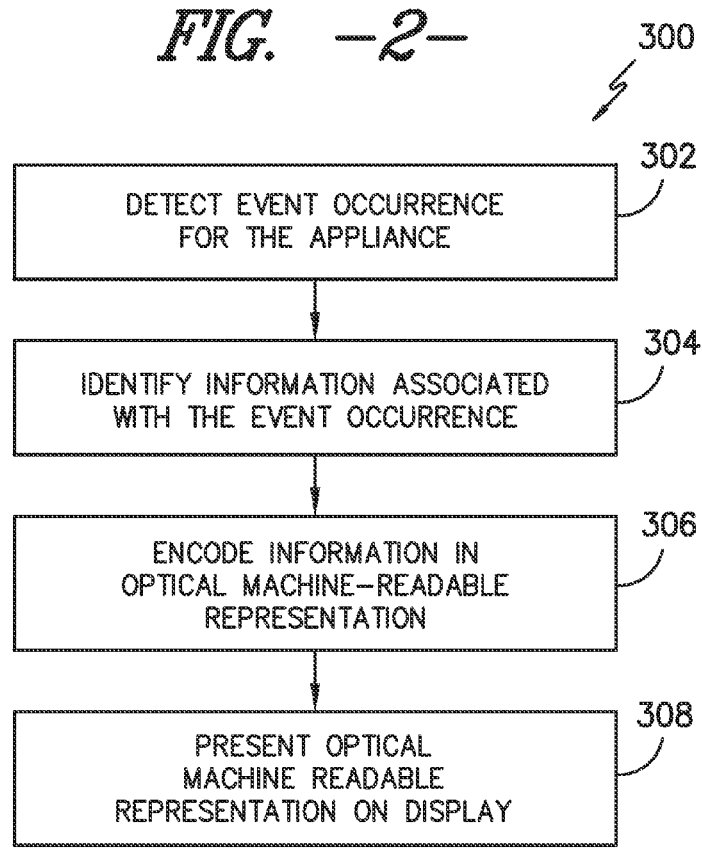
FIG. -3-

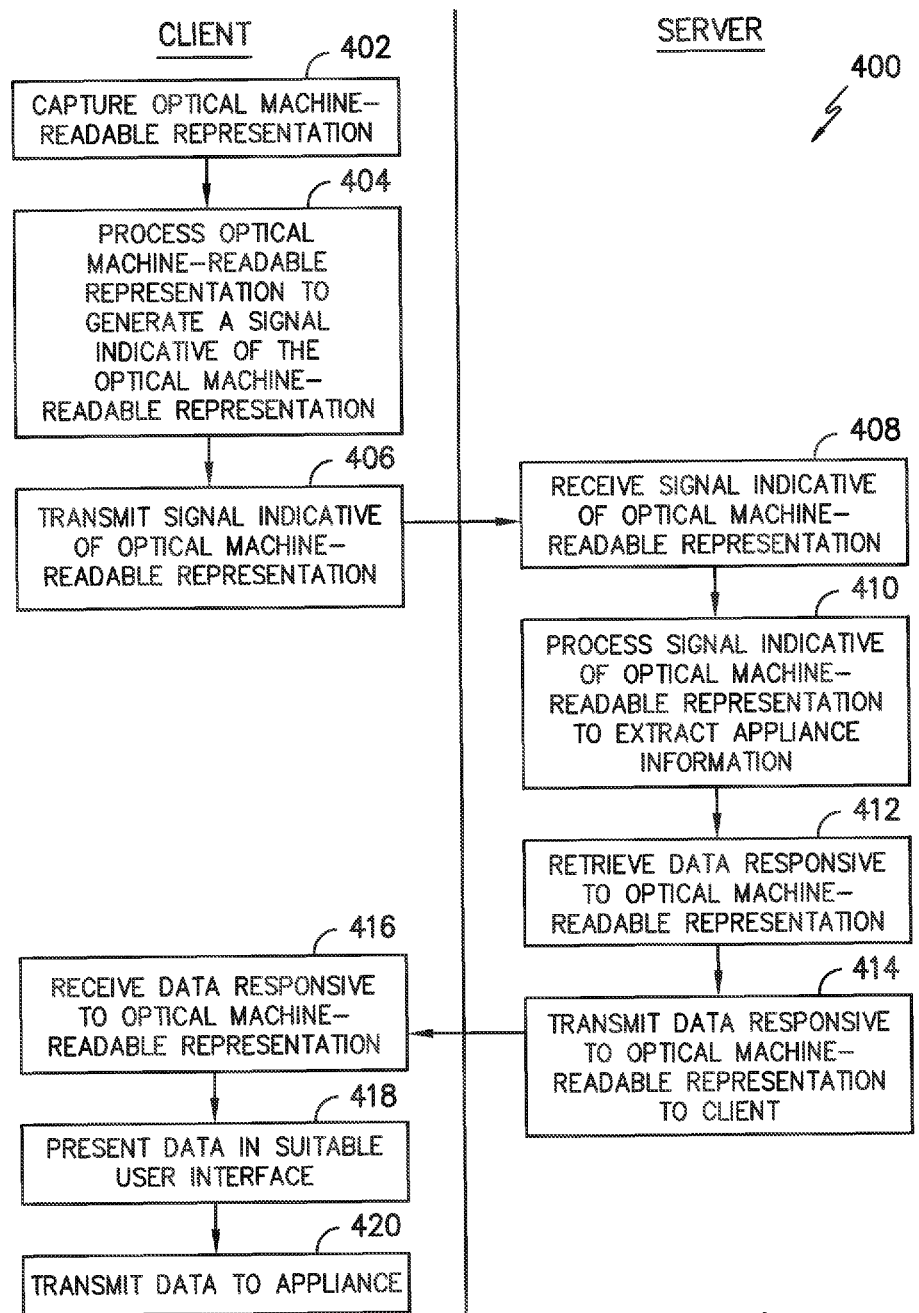
FIG. -4-

COMMUNICATION OF DIGITAL INFORMATION PRESENTED ON AN APPLIANCE DISPLAY

FIELD OF THE INVENTION

The present disclosure relates to generally to appliances, and more particularly to a system and method of transmitting information, such as diagnostic information, associated with an appliance.

BACKGROUND OF THE INVENTION

Appliances including washing machines, dryers, refrigerators, microwave ovens, ovens, cooktops, and the like can be used for a variety of purposes. Often times it is desirable to obtain information, such as diagnostic information, associated with an appliance. This information can be used, for instance, to assist with repair or maintenance of the appliance. Many conventional appliances, however, do not have the capability to communicate information, such as diagnostic information, with other devices.

More recently, appliances have included network interface devices and microcontrollers or microprocessors that allow the appliance to communicate with other devices over a network. For instance, an appliance can access diagnostic information from a remote site, such as a server, over a network and either present the diagnostic information on a suitable user interface or communicate this information over the network to a local computing device. However, these systems can be complex and costly to install and maintain.

Thus, a need exists for an improved system and method of transmitting information, such as diagnostic information, associated with an appliance so that the information can be readily accessed.

BRIEF DESCRIPTION OF THE INVENTION

Aspects and advantages of the invention will be set forth in part in the following description, or may be apparent from the description, or may be learned through practice of the invention.

One exemplary aspect of the present disclosure is directed to a computer-implemented method of communicating information associated with an appliance. The method includes capturing, at a computing device, information indicative of an optical machine-readable representation of information. The optical machine-readable representation of information is presented on a display of the appliance. The method further includes accessing, with the computing device, data associated with the appliance responsive to the optical machine-readable representation.

Another exemplary aspect of the present disclosure is directed to a computer-implemented method of communicating information associated with an appliance. The method includes detecting an event occurrence for the appliance and identifying information associated with the event occurrence. The method further includes communicating information associated with the event occurrence to a remote device placed in proximity to the appliance using near field communication.

Yet another exemplary aspect of the present disclosure is directed to an appliance. The appliance includes a display and a controller. The controller is configured to execute computer-readable instructions stored in a memory to cause the controller to perform operations. The operations include detecting an event occurrence for the appliance and identifying information associated with the event occurrence. The operations further include encoding the information associated with the event occurrence in an optical machine-readable representation. The optical machine-readable representation is digitally encoded in a non-human readable display format. The operations further include presenting the optical machine readable representation on the display.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a block diagram of a system for communicating information associated with an appliance according to an exemplary embodiment of the present disclosure;

FIG. 2 depicts an exemplary optical machine-readable representation presented on a display of an appliance according to an exemplary embodiment of the present disclosure;

FIG. 3 depicts a flow diagram of an exemplary method according to an exemplary embodiment of the present disclosure; and FIG. 4 depicts a client-server flow diagram of an exemplary method according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure relates to a system and method of communicating information associated with an appliance. In particular, upon an event occurrence at the appliance, such as an occurrence triggering the need for a maintenance event, repair event, or other diagnostic event, an appliance can generate an optical machine-readable representation encoding information associated with the event occurrence. The appliance can then present the optical machine-readable representation on a display for capture by a remote computing device. The optical machine-readable representation can be any suitable digitally encoded display format and can include a linear bar code, matrix bar code, or a digital image.

A computing device, such as a computer, tablet, smartphone, PDA, mobile device, or other computing device, can capture information associated with the optical machine-readable representation. For example, the client can capture a digital image of the optical machine-readable representation using a suitable image capture device, such as a digital camera. Alternatively, a near-field communication technique can be used such that information related to the event occurrence can be transmitted from the appliance to the computing device when the client is placed in proximity to the appliance.

Once the information associated with the event occurrence is captured, the computing device can access data, such as diagnostic information, user guide information, appliance use information, executable code (e.g. computer languages such as Java, XML and other languages that can be interpreted, compiled and run on the computing device), commercial information, and/or other suitable information responsive to the optical machine-readable representation. For instance, the computing device can access data responsive to the optical machine-readable representation stored in a local memory of the computing device. Alternatively, the client can then transmit the captured information to a server over a network. The server can process the transferred information to identify data responsive to the machine-readable representation and transmit the data to the computing device. The data can be communicated to the computing device in a manner that can be directly executed by the computing device or as a scripted language program. The computing device can display the data on a suitable user interface and/or communicate the data to the appliance.

In this manner, information associated with an event occurrence for the appliance can be presented on a computing device, such as a smartphone, to a user in a format and in an environment that can be more convenient for the user. In particular, a user's experience can be enhanced allowing more detailed interaction in a user friendly environment familiar to the user by displaying the retrieved data at a computing device, such as a smartphone, associated with the user. In addition, the additional information associated with the event occurrence can be accessed from a server without requiring direct communication from the appliance to the server.

FIG. 1 illustrates a block diagram of a system 100 according to an exemplary embodiment of the present disclosure. The system 100 includes an appliance 110. The appliance 110 can be any type of appliance. For instance, the appliance 110 can be a refrigerator, a dishwasher, a washing machine, a dryer, a microwave, an oven, a cooktop, an air conditioner, a water softener, or other suitable appliance. In addition, the appliance 110 can be a multifunctional device capable of performing multiple appliance operations within a single device such as vacuum food sealer, beverage dispenser, etc.

The appliance 110 can include a display 150, a near-field antenna 155, a controller 160, and an input device 165. Display 150 can be any type of display such as a liquid crystal display. Input device 165 can receive input from a user. The input device 165 can include input components having one or more of a variety of electrical, mechanical or electro-mechanical input devices including rotary dials (knobs), push buttons, toggle/rocker, switches, touch screens and other devices.

The controller 160 can be positioned at any location in the appliance 110. In addition, when controller 160 is a single controller it can be the only controller in the appliance 110 such that controller 160 controls all operations of the appliance. Alternatively, when the appliance 110 includes a plurality of controllers, controller 160 can be a sub-controller coupled to the overall appliance controller or it could be the overall appliance controller. If controller 160 is a sub-controller, it can be located with the overall appliance controller or be separate from the overall appliance controller.

The controller 160 can include memory and a processor. By way of example, any/all of the "controllers" discussed in this disclosure, may include a memory and one or more processing devices such as microprocessors, CPUs or the like, such as general or special purpose microprocessors operable to execute programming instructions or micro-control code associated with operation of an appliance. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform the oven control functionality instead of relying upon software.

The memory of the controller 160 can store computer-readable instructions that when executed by the controller, cause the controller to perform operations. For instance, when the appliance 110 is a washing machine, the controller 160 can store instructions in the memory relating to operation such as washing cycles, water temperatures, etc. The controller 160 can also store instructions directed to the presentation of an optical machine-readable representation in response to an event occurrence for the appliance.

In particular, the controller 160 can be configured to detect an event occurrence for the appliance. The event occurrence can include any type of event for the appliance where the access and display of additional information associated with the appliance may be desired. For instance, the event occurrence can include any event that can trigger the need for diagnostic information, user guide instructions, executable code, appliance use information, commercial information to allow a user to purchase items related to the appliance, or other information. In one example, the event occurrence can be an event that triggers the need for maintenance, repair, or diagnostics of the appliance. Another event occurrence can be a user input requesting additional information. Yet another event occurrence can be the expiration of a period of time or the need to replace one or more components of the appliance.

According to one particular aspect of the present disclosure, the controller 160 can identify information associated with the event occurrence and encode the information in an optical machine-readable representation. For instance, the controller 160 can identify a unique code associated with the event occurrence and encode the unique code in an optical machine readable-representation. The controller 160 can then present the optical machine-readable representation on the display 150 of the appliance 110. As used herein, an optical machine-readable representation is any suitable optical representation of information that is detectable and readable by a machine. The optical machine-readable representation can be presented in a digitally encoded display format including a non-human readable digitally encoded display format, such as a linear or matrix barcode or a digital image.

FIG. 2 depicts an exemplary optical machine-readable representation 220 that is presented on a display 150 of an appliance. The optical machine-readable representation 220 of FIG. 2 is a matrix barcode. As shown, the optical machine-readable representation 220 is in a non-human readable digitally encoded display format. A non-human readable digitally encoded display format encodes information in a format that cannot be read or decoded by a human observer without assistance.

The optical machine readable representation 220 presented on the display 150 can be associated with the appliance 110 or associated with another appliance in communication with the appliance 110. For instance, as shown in FIG. 1, the appliance 110 can be in communication with a second appliance 210. Although only one additional appliance 210 is depicted in FIG. 1, more than one additional appliance 210 can be in communication with appliance 110 without deviating from the scope of the present disclosure. The controller 160 can present an optical machine-readable representation associated with any appliance coupled to appliance 110 on the display of the appliance 110.

After the controller 160 generates and causes the optical machine-readable representation to be presented on the display 150, the appliance 110 can provide an indication that the representation has been displayed. For instance, an audio and/or visual indicator can be initiated upon display of the representation to alert a user that the representation has been generated.

The client computing device 120 can be any type of computing device, such as a computer, mobile device, smartphone, tablet, PDA or other suitable device. The computing device 120 can include a memory 121, a processor 122, a display for presenting a user interface, and a network interface to interact with network 130. A client computing device 120 can capture information associated with the event occurrence using image capture techniques or near field communication techniques.

In particular, the client computing device 120 can include an image capture device, such as a digital camera, that can capture a digital image of the optical machine readable representation. Alternatively or in addition, the client computing device 120 can capture information associated with the event occurrence using near field communication with the near field communication antenna 155 of the appliance 110. For instance, the client computing device 120 can receive information using near field communication techniques when the client computing device 120 is placed in proximity with the appliance 110, such as on a surface of the appliance 110.

Once the information associated with the event occurrence has been captured, the client computing device 120 can access data associated with the appliance responsive to the information. For instance, the client computing device 120 can access data locally stored in the memory 121 of the client computing device. Alternatively, the client computing device 120 can access data stored on a server 140 by sending a request for data responsive to the information over a network 130. The network 130 can include any type of network and can include any number of wired and/or wireless communication links.

Similar to the client computing device 120, the server can also include a memory 141 and a processor 142. The server 140 can be configured to receive a request for data responsive to the optical machine-readable representation or other information associated with an event occurrence over the network 130 and provide data responsive to the request to the client computing device 120. The client computing device 120 can then present the data on a suitable user interface. The data responsive to the optical machine-readable representation can include diagnostic information, help information, user guide information, executable code, appliance use information, and commercial information. For example diagnostic information can be presented to help troubleshoot a problem with the appliance.

In one example, the appliance 110 can display an optical machine-readable representation as a result of an event occurrence that triggers the need for maintenance, repair, or other action. The client computing device 120 can capture the optical machine-readable representation and access data including diagnostic information responsive to the optical machine readable representation that can be presented on a user interface of the client computing device 120 to assist the appliance owner or a repair technician in performing maintenance or repair on the appliance.

In another example, the appliance 110 can display an optical machine-readable representation as a result of an event occurrence that includes receiving a request for additional information associated with the appliance 110 by a user, for instance, via a user input device. The client computing device 120 can capture the optical machine-readable representation and access data including, help information, user guide instructions, and appliance use information responsive to the optical machine-readable representation.

In still another example, the appliance 110 can display an optical machine-readable representation as a result of an event occurrence that includes expiration of a predetermined period of time or the end of the useful life of a component of the appliance. For instance, when a refrigerator includes a water filter, the appliance 110 can display an optical machine-readable representation when the water filter needs to be replaced. The client computing device 120 can capture the machine-readable representation and access data including commercial information that can be presented to a user to allow a user to purchase a replacement water filter.

FIG. 3 depicts a flow chart for an exemplary method (300) according to an exemplary embodiment of the present disclosure. The method (300) can be implemented using any suitable appliance, such as the appliance 110 of FIG. 1. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (302), the method includes detecting an event occurrence for the appliance. The event occurrence can include any type of event for the appliance where the access and display of additional information associated with the event may be desired. For instance, the event occurrence can include any event that can trigger the need for diagnostic information, user guide instructions, appliance use information, commercial information to allow a user to purchase items related to the appliance, or other information.

At (304), the method includes identifying information associated with the event occurrence. For instance, the controller 160 of appliance 110 can access a database of unique codes associated with particular types of event occurrences. At (306), the method includes encoding the information in an optical machine readable representation, such as a linear barcode, a matrix barcode, or a digital image. At (308), the method includes displaying the optical machine-readable representation on a display of the appliance. For instance, the appliance 110 can display the optical machine-readable representation on the display 150. The optical machine-readable representation can then be captured by a computing device and used to access information responsive to the optical machine-readable representation as will be discussed below.

FIG. 4 illustrates an exemplary client-server flow diagram of an exemplary method (400) according to an exemplary embodiment of the present disclosure. The method (400) can be implemented using any suitable client-server architecture, such as the system depicted in FIG. 1. In addition, FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (402), a client can capture information indicative of an optical machine-readable representation presented on the display of an appliance. For instance, the client can capture a digital image of the optical machine-readable representation using an image capture device or can acquire information associated with the event occurrence using near field communication. At (404), the client processes the information indicative of the optical machine-readable representation to generate a signal, such as a data packet, indicative of the optical machine-readable representation or other information associated with the event occurrence. The client transmits the signal to a server over a network at (406).

The server can receive the signal at (408) and process the signal to identify data related to the appliance and responsive to the optical machine-readable representation or other information associated with the event occurrence (410). At (412), the server can retrieve the identified data associated with the appliance from memory and transmit the data to the appliance (414).

At (416), the client receives the data responsive to the optical machine-readable representation or other information associated with the event occurrence and presents the data in a suitable user interface (418). The data can be presented in the user interface in a format that is familiar to and easily understood by the user. The client can then transmit the data to the appliance (420), for instance, using near field communication technique, in situations where the appliance requires additional information.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of communicating information associated with a refrigerator, comprising:
    capturing, at a computing device, information indicative of an optical machine-readable representation of information, the optical machine-readable representation presented on a digital display of a refrigerator, the optical machine-readable representation comprising a matrix barcode generated responsive to a detection of an event occurrence associated with the refrigerator, wherein the event occurrence is associated with a need to replace a water filter associated with the refrigerator; and
    accessing, with the computing device, data associated with the refrigerator responsive to the optical machine-readable representation, the data indicative of commercial information associated with purchasing a replacement water filter.

2. The computer-implemented method of claim 1, wherein accessing, with the computing device, data associated with the refrigerator responsive to the optical machine-readable representation comprises:
    transmitting, from the computing device to a server, a signal indicative of the optical machine-readable representation of information displayed on the display of the refrigerator over a network; and
    receiving, at the computing device, the data associated with the refrigerator from the server responsive to the signal indicative of the optical machine-readable representation of information.

3. The method as in claim 1, wherein capturing, at a computing device, information indicative of an optical machine-readable representation comprises capturing a digital image of the optical machine-readable representation.

4. The method as in claim 1, wherein the method comprises placing the computing device in proximity to the refrigerator such that the computing device receives information from the refrigerator using near-field communication.

5. The method as in claim 1, wherein the method further comprises presenting the data associated with the refrigerator in a user interface.

6. The method as in claim 1, wherein the optical machine-readable representation encodes information associated with an appliance in communication with the refrigerator.

7. The method as in claim 1, wherein the optical machine-readable representation of information is digitally encoded in a non-human readable display format.

8. The method as in claim 6, wherein the digitally encoded display format comprises a digital image.

9. The method as in claim 1, further comprising transmitting the data associated with the refrigerator from the computing device to the refrigerator.

10. A refrigerator, comprising:
    a display;
    a controller, the controller configured to execute computer-readable instructions stored in a memory to cause the controller to perform operations, the operations, the operations comprising:
    detecting an event occurrence for the refrigerator, the event occurrence being associated with a need to replace a water filter associated with the refrigerator;
    identifying information associated with the event occurrence, the information comprising commercial information associated with purchasing a replacement water filter;
    encoding the information associated with the event occurrence in a non-human readable optical machine-readable representation, the optical machine-readable representation digitally encoded in a nonhuman readable display format; and
    presenting the non-human-readable optical machine readable representation on the display.

11. The refrigerator of claim 10, wherein the refrigerator further comprises an antenna capable of near field communication, the antenna configured to communicate information associated with the event occurrence.

12. The refrigerator of claim 10, wherein the non-human readable optical machine readable representation comprises a linear or matrix barcode.

13. The refrigerator of claim 10, wherein the non-human readable optical machine readable representation comprises a digital image.

* * * * *